(12) United States Patent
Imai

(10) Patent No.: US 7,306,236 B2
(45) Date of Patent: Dec. 11, 2007

(54) CYLINDER HEAD GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/376,061

(22) Filed: Mar. 16, 2006

(65) Prior Publication Data

US 2006/0232018 A1    Oct. 19, 2006

(30) Foreign Application Priority Data

Apr. 14, 2005   (JP) .............................. 2005-117069

(51) Int. Cl.
  *F02F 11/00*   (2006.01)
(52) U.S. Cl. ....................................... 277/598; 277/592
(58) Field of Classification Search ................. 277/598, 277/592
  See application file for complete search history.

(56) References Cited

U.S. PATENT DOCUMENTS

| 1,771,596 | A | * | 7/1930 | Victor | 277/598 |
|---|---|---|---|---|---|
| 3,567,234 | A | * | 3/1971 | Skrycki | 277/595 |
| 4,126,318 | A | * | 11/1978 | Belter | 277/598 |
| 5,082,298 | A | * | 1/1992 | Uchida et al. | 277/595 |
| 5,131,668 | A | * | 7/1992 | Uchida | 277/595 |
| 5,348,311 | A | * | 9/1994 | Miyaoh et al. | 277/598 |
| 5,395,128 | A | * | 3/1995 | Udagawa | 277/595 |
| 5,408,963 | A | * | 4/1995 | Miyaoh et al. | 123/193.3 |
| 5,460,387 | A | * | 10/1995 | Miyaoh et al. | 277/601 |
| 5,979,905 | A | * | 11/1999 | Fischer et al. | 277/591 |
| 6,062,573 | A | * | 5/2000 | Budovec et al. | 277/598 |
| 6,213,477 | B1 | * | 4/2001 | Miyaoh | 277/598 |
| 6,722,661 | B2 | * | 4/2004 | Fritz | 277/598 |
| 6,935,635 | B2 | * | 8/2005 | Matsushita | 277/592 |

* cited by examiner

*Primary Examiner*—Alison K Pickard
(74) *Attorney, Agent, or Firm*—Manabu Kanesaka

(57) ABSTRACT

A metal laminate cylinder head gasket has a first metal plate having a first notched portion, a second metal plate having a folded projection extending therefrom, and a middle metal plate having, adjacent to the first notched portion, a second notched portion. The middle metal plate is clamped between the first metal plate and the second metal plate. The folded projection is located such that in an area defined by the first and second notched portions, the first and middle metal plates are clamped by the folded projection. The gasket combines the function of a shim for adjusting the thickness of the gasket, and the function of affixing the metal plates.

7 Claims, 3 Drawing Sheets

CYLINDER HEAD GASKET

BACKGROUND OF THE INVENTION AND RELATED ART STATEMENT

The present invention relates to a metal laminate cylinder head gasket for an internal combustion engine wherein a plurality of cylinder bores is aligned parallel to each other in a cylinder block.

In a metal laminate cylinder head gasket installed between a cylinder head and cylinder block for an engine whose multiple cylinder bores are aligned in a row in a single cylinder block, shims for adjusting the thickness are installed on both ends of a combustion chamber bore corresponding to the row of cylinder bores of a cylinder head, and both ends of the combustion chamber bore are formed thicker than the other flat part. As a result, conventionally, for example, as described in Japanese Utility Model Publication No. 6-35734, the metal laminate cylinder head gasket generally controls the cylinder head so as to bend with the imbalance of the tightening force that occurs when affixing the gasket by a tightening bolt.

Also, for example, as described in Japanese Utility Model Registration No. 2542296, conventionally, the same gasket is generally provided with a folded portion on the outer circumference of a metal plate of one outer layer constituting the gasket, and the other metal plate is clamped and affixed at the folded portion. The shims for adjusting the thickness thereof and the folded portion for affixing the laminated metal plate are generally provided separately near the outer circumference of the gasket.

However, depending on the shape of the engine, the shims cannot be installed near the outer circumference of the gasket, or the space for providing the folded portion cannot be retained. As a result, there is the situation that it is difficult to provide the shims for adjusting the thickness and the folded portion for separately affixing the laminated metal plate in the gasket.

In consideration of the above-described problem, an object of the present invention is to provide a metal laminate cylinder head gasket capable of effectively utilizing the space near the outer circumference of the narrow gasket, and of combining the function of the shims for adjusting the thickness of the gasket and the function of the folded portion for affixing the laminated metal plate, which conventionally needed to be provided separately.

Further objects and advantages of the invention will be apparent from the following description of the invention.

SUMMARY OF INVENTION

In order to solve the above-described problems, according to the present invention a metal laminate cylinder head gasket is provided for an engine in which multiple cylinder bores run parallel to a single cylinder block and are aligned in a row, and in which a cylinder head is affixed around each cylinder bore by tightening bolts.

The metal laminate cylinder head gasket is formed by clamping at least one metal plate of a middle layer between a metal plate of a first outer layer and a metal plate of a second outer layer. One part of the outer circumference of the metal plate of the first outer layer is notched so that at least one notched portion is formed.

At the same time, next to the notched portion, a part of the outer circumference of at least one metal plate of the middle layer is notched and also forms a notched portion. In a range of notched portions thereof, each metal plate except for the metal plate in which the latter notched portion is formed is clamped by folding back a projection extending to the metal plate of the second outer layer.

In a preferred embodiment of the metal laminate cylinder head gasket, it is desirable to make the metal plate of the second outer layer thicker than the metal plate of the first outer layer. It is also preferable to make the notched portion in which one part of the metal plate of the middle layer is notched deeper than the notched portion of the metal plate of the first outer layer.

The metal laminate cylinder head gasket with the above-described structure clamps the metal plate of the first outer layer and the metal plate of the middle layer by folding back the projection of the metal plate of the second outer layer. As a result, the metal plates thereof can be affixed by the projection.

Also, since the projection is provided in the metal plate of the second outer layer which is thicker than the metal plate of the first outer layer, the laminated thickness of the folded portion (i.e., the portion at which the projection is folded back), is thicker than the other flat part.

In addition, the folded portions are provided on both ends of the arranging direction of the row of combustion chamber bores of the gasket. As a result, the bending of the cylinder head that may occur by the imbalance of the tightening force when tightening the bolt can be controlled. The folded portion can be provided in an optional position for controlling the bending of the cylinder head.

According to the above-described invention, a metal laminate gasket is provided that is capable of effectively utilizing the space of the outer circumference of the narrow gasket, and of combining the function of the shim for adjusting the thickness of the gasket, and the function of the folded portion for affixing the laminated metal plate.

DETAILED DESCRIPTION OF THE PREFERRED EMBODIMENTS

Hereinafter, embodiments of a metal laminate cylinder head gasket according to the present invention are explained with reference to the drawings.

FIGS. 1-4(*c*) show an embodiment of a metal laminate cylinder head gasket according to the invention. A metal laminate cylinder head gasket 2 is capable of being installed between a cylinder head and cylinder block in an engine in which multiple cylinder bores parallel to each other are provided in a single cylinder block. The cylinder head is affixed on both sides of the row of the cylinder bores in the middle between the cylinder bores and outside the cylinder bores on both ends by tightening bolts.

The gasket 2 is provided by clamping a metal plate 8 of a middle layer between a metal plate 4 of a first outer layer and a metal plate 6 of a second outer layer. The metal plate 6 is thicker than the metal plate 4.

Figure 1:
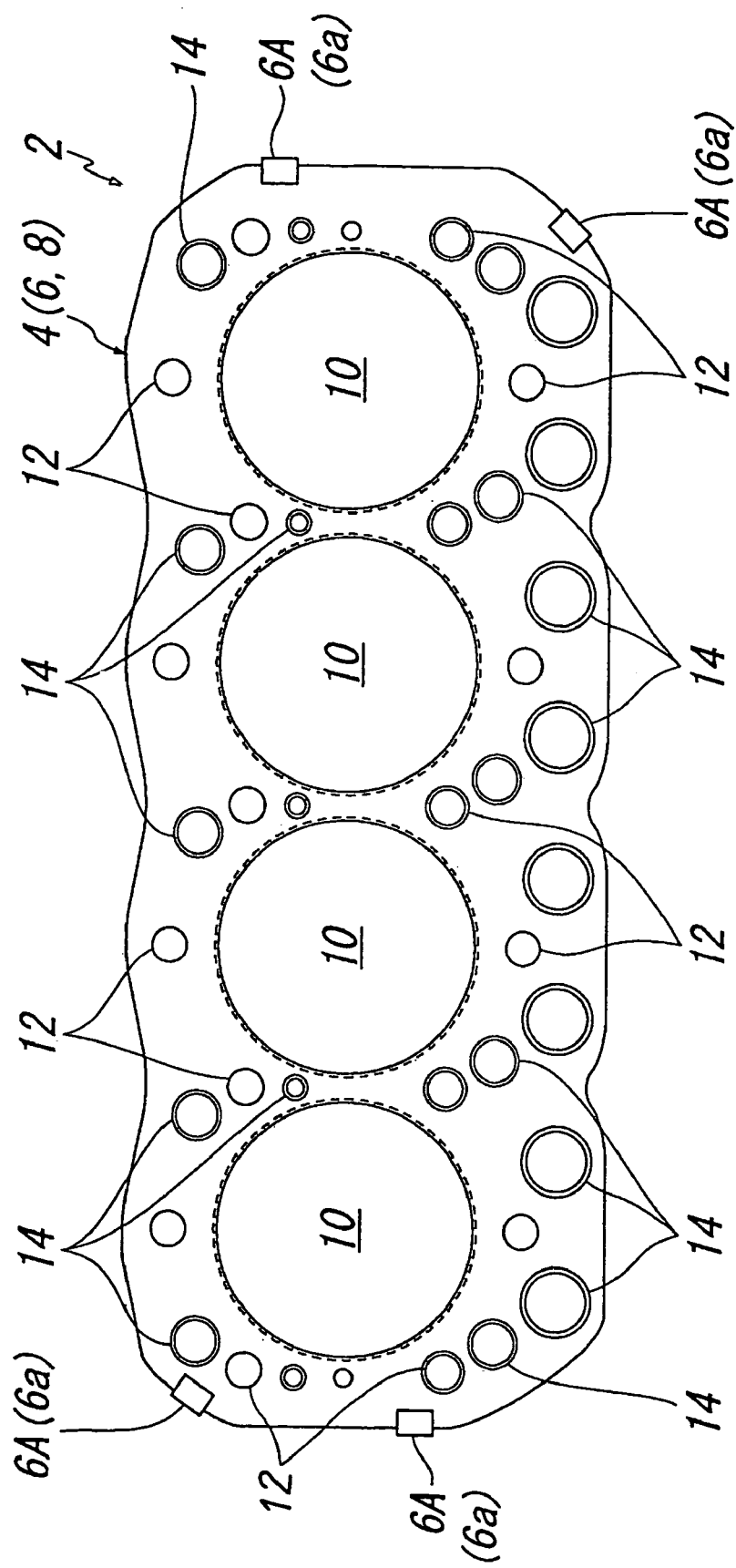
FIG. 1 is a plan view of an embodiment of a metal laminate cylinder head gasket according to the present invention.

In the gasket 2, as shown in FIG. 1, multiple combustion chamber bores 10 corresponding to the cylinder bores are arranged in a line, and bolt bores 12 are provided around each combustion chamber bore 10 respectively corresponding to a position in which the tightening bolt is disposed. The arrangement of the bolt bores 12 is not necessarily limited to the configuration shown in the figure. Also, fluid bores 14 corresponding to various types of fluid bores such as a water bore or an oil bore provided in the cylinder block are provided around the combustion chamber bores 10 and the bolt bores 12.

Figure 2:
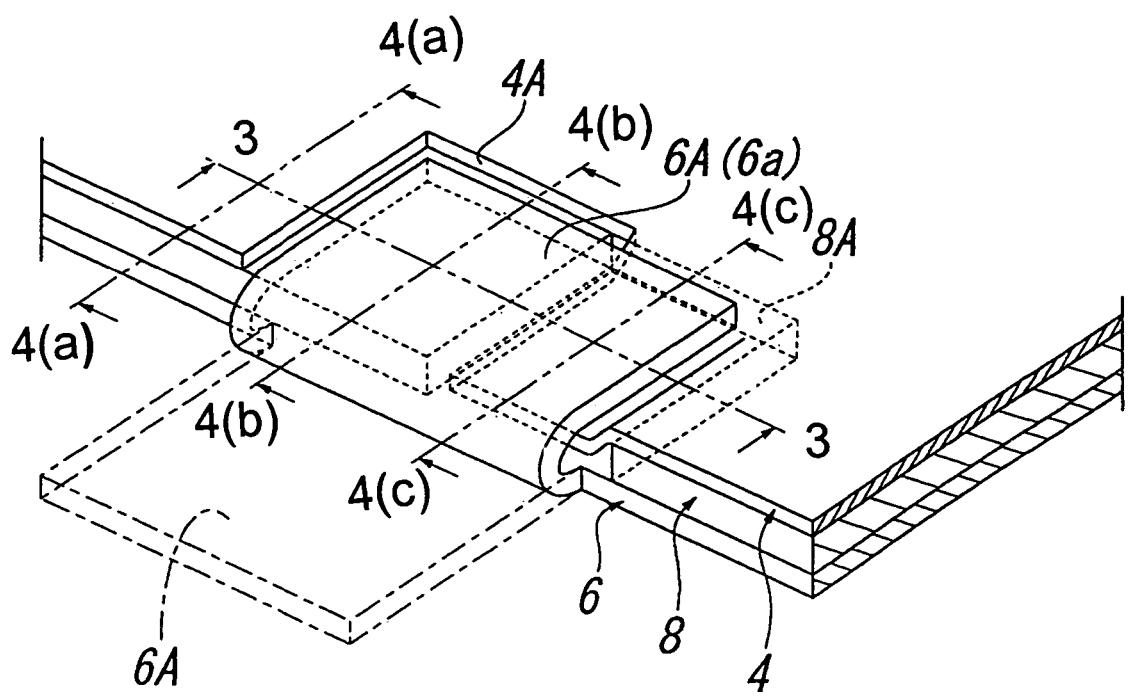
FIG. 2 is a partially enlarged perspective view of a folded portion of the gasket.

More specifically, as shown in FIGS. 1 and 2, in the metal plate 4 of the first outer layer constituting the gasket 2, notched or opening portions 4A are provided respectively near each of two bolt bores 12 near both ends of the arranging direction of the row of the combustion chamber bores 10 of the gasket 2. The notched portions 4A are provided by notching a part of the outer circumference of the metal plate 4.

Also, next to the notched portions 4A, notched or opening portions 8A in which one part of the outer circumference of the metal plate 8 is notched, are formed in the metal plate 8 of the middle layer clamped by the first and second metal plates 4, 6. In the notched portions 8A, the thickness $T_3$ of the metal plate 8 of the middle layer is thicker than a thickness $T_1$ of the metal plate 4 of the first outer layer. As a result, the notched portions 8A are deeper than the notched portions 4A of the metal plate 4 of the first outer layer.

Figure 3:
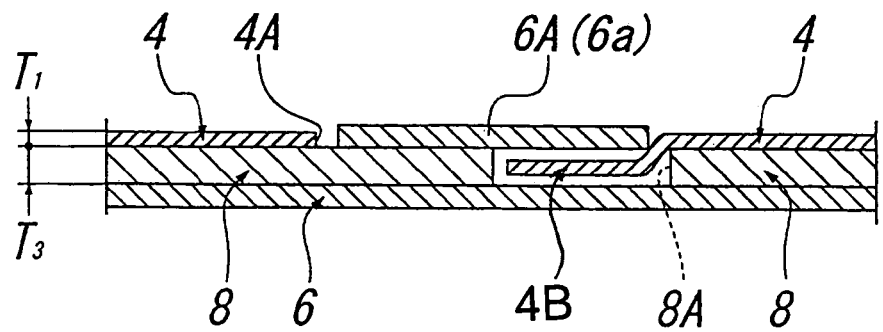
FIG. 3 is a sectional view taken along line 3-3 in FIG. 2.
Figure 4A:
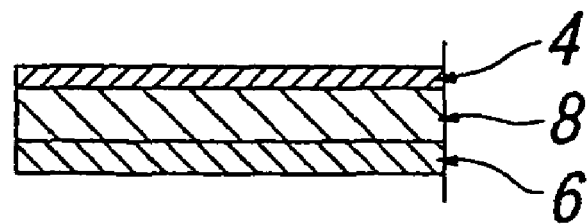
FIG. 4(*a*) is a sectional view taken along line 4(*a*)-4(*a*) in FIG. 2, FIG. 4(*b*) is a sectional view taken along line 4(*b*)-4(*b*) in FIG. 2, and FIG. 4(*c*) is a sectional view taken along line 4(*c*)-4(*c*) in FIG. 2.
Figure 4B:
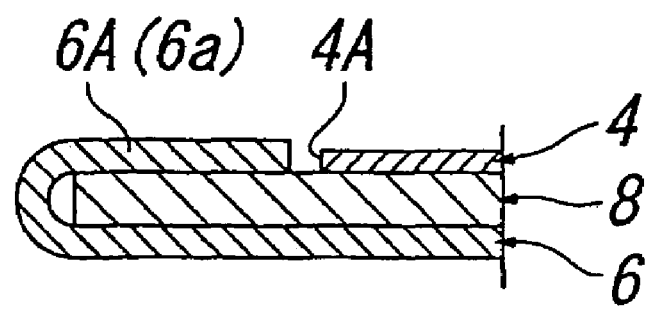
Figure 4C:
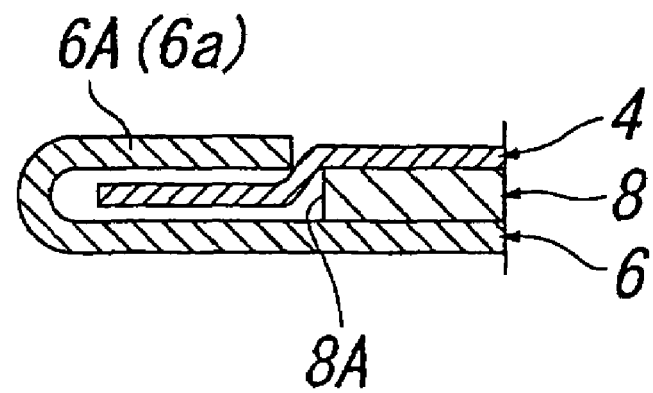

As shown in FIGS. 2-4(*a*), 4(*b*), 4(*c*), in the notched portions 4A of the metal plate 4 of the outer layer and the notched portions 8A of the metal plate 8 of the middle layer, the projections 6A extending from the metal plate 6 of the second outer layer are folded back. As a result, the metal plate 4 of the outer layer and the metal plate 8 of the middle layer except for parts of a range of the notched portions 4A, 8A are clamped by folded portions 6a of the projections 6A. Thus, the thickness of lamination layers of the folded portions 6a is thicker than other flat parts of the gasket.

In particular, when the metal plates 4, 6 and 8 are assembled, an edge portion 4B adjacent the notched portion 4A is placed above the notched portion 8A. The projection 6A has a width to cover the notched portions 4A and 8A (edge portion 4B). When the projection 6A is folded and the folded portion 6a is clamped, the edge portion 4B is placed in the notched portion 8A and the edge portion 4B is pushed into the notched portion 8A. Thus, the folded portion 6a holds the metal plates 4 and 8.

In the above-described embodiment, a configuration is provided in which the metal plate 8 of the sheet of the middle layer is clamped between the metal plate 4 of the first outer layer and the metal plate 6 of the second outer layer. The invention, however, is not limited to the embodiment described hereinabove. The invention can be structured, for example, in such a way that the metal plates of multiple middle layers of more than two sheets are clamped between the metal plate of the first outer layer and the metal plate of the second outer layer. In such an embodiment, the thickness of the total of the multiple metal plates constituting the middle layers is required to be thicker than the thickness of the metal plate of the first outer layer.

Also, the notched portions provided in the metal plates of middle layers thereof can be formed in optimal metal plates constituting the middle layers. However, the depth of the notched portions provided in the metal plates of middle layers thereof is certainly required to be formed deeper than the depth of the notched portions formed in the metal plate of the first outer layer as a whole.

The metal laminate cylinder head gasket 2 with the above-described structure clamps the metal plate 4 of the first outer layer and the metal plate 8 of the middle layer by folding back the projections 6A extending to the metal plate 6 of the second outer layer. As a result, the metal plates 4, 8 can be clamped and affixed by the folded portions 6a of the projections 6A.

Also, since the projections 6A are provided in the metal plate 6 of the second outer layer which is thicker than the metal plate 4 of the first outer layer, the thickness of the lamination layers of the folded portions 6a is thicker than the other flat parts of the gasket when the projections 6A are folded back.

In addition, the folded portions 6a are provided on both ends of the arranging direction of the row of the combustion chamber bores in the gasket 2. As a result, even if the entire bolt is tightened by a tightening force of approximately the same amount, the tightening force of the bolt relative to the cylinder bores is equalized. Therefore, bending of the cylinder head resulting from the imbalance of the tightening force by the tightening bolt can be controlled.

In the above-described embodiment, a configuration in which the folded portions 6a are provided on both ends of the arranging direction of the row of the combustion chamber bores in the gasket 2 is explained. As an option, however, the folded portions 6a can be provided in another position in order to control the bending of the cylinder head.

As described above, the invention provides a metal laminate cylinder head gasket capable of effectively utilizing the space of the outer circumference of the narrow gasket. The gasket combines the function of shims for adjusting the thickness of the gasket and the function of the folded portions for affixing the laminated metal plates, which conventionally needed to be provided separately.

The disclosure of Japanese Patent Application No. 2005-117069 filed on Apr. 14, 2005, is incorporated herein.

While the invention has been explained with reference to the specific embodiment of the invention, the explanation is illustrative, and the invention is limited only by the appended claims.

What is claimed is:

1. A metal laminate cylinder head gasket comprising:
   a first metal plate having a first opening portion provided in a part of an outer circumference thereof,
   a second metal plate disposed under the first metal plate,
   at least one middle metal plate situated between the first and second metal plates, and having, adjacent to the first opening portion, a second opening portion provided in a part of an outer circumference thereof, said at least one middle metal plate being partly located under the first opening portion and the first metal plate being partly located above the second opening portion, and
   a folded projection projecting from the second metal plate, said folded projection being disposed in the first opening portion and located above a part of the first metal plate such that the first and middle metal plates are clamped by the folded projection.

2. A metal laminate cylinder head gasket according to claim 1, wherein said first and second opening portions communicate together when the first and middle plates are assembled together.

3. A metal laminate cylinder head gasket according to claim 2, wherein the first metal plate has an edge portion located adjacent to the first opening portion and above the second opening portion.

4. A metal laminate cylinder head gasket according to claim 3, wherein the folded projection has a width to cover at least parts of the first opening portion and the edge portion.

5. A metal laminate cylinder head gasket according to claim 1, wherein the middle metal plate comprises a plurality of middle metal plate members laminated together.

6. A metal laminate cylinder head gasket according to claim 1, wherein said folded projection directly faces the at least one middle metal plate in the first opening portion and the first metal plate above the second opening portion.

7. A metal laminate cylinder head gasket comprising:
a first metal plate having a first opening portion provided in a part of an outer circumference thereof,
a second metal plate disposed under the first metal plate,
at least one middle metal plate situated between the first and second metal plates, and having, adjacent to the first opening portion, a second opening portion provided in a part of an outer circumference thereof, and
a folded projection projecting from the second metal plate and disposed in the first opening portion such that the first and middle metal plates are clamped by the folded projection,
wherein the second metal plate is thicker than the first metal plate, and the second opening portion is deeper than the first opening portion.

* * * * *